United States Patent [19]

Keller et al.

[11] Patent Number: 4,630,330
[45] Date of Patent: Dec. 23, 1986

[54] FASTENING CLIP ROTATABLE IN A HOUSING BORE

[75] Inventors: Manfred Keller; Rudi Kölle, both of Sindelfingen; Winfried Schreiber, Stuttgart; Klaus Claar, Sindelfingen, all of Fed. Rep. of Germany

[73] Assignee: Daimler-Benz Aktiengesellschaft, Stuttgart, Fed. Rep. of Germany

[21] Appl. No.: 777,590

[22] Filed: Sep. 19, 1985

[30] Foreign Application Priority Data

Sep. 22, 1984 [DE] Fed. Rep. of Germany ....... 3434849

[51] Int. Cl.[4] ............................................. B23P 11/02
[52] U.S. Cl. ......................................... 16/2; 16/108; 248/56
[58] Field of Search ...................... 16/2, 108, 109, 82; 29/837, 845; 174/152 G; 339/128; 248/56

[56] References Cited

U.S. PATENT DOCUMENTS

| | | | |
|---|---|---|---|
| 3,768,115 | 10/1973 | Hoffman et al. | 248/56 |
| 3,788,582 | 1/1974 | Swanquist | 248/56 |
| 4,117,998 | 10/1978 | Notoya | 248/56 |
| 4,181,337 | 1/1980 | Muller | 16/2 X |
| 4,232,421 | 11/1980 | Tucker | 16/2 |
| 4,299,363 | 11/1981 | Oatschefski | 16/2 X |

FOREIGN PATENT DOCUMENTS 967224  8/1964  United Kingdom.

Primary Examiner—Jimmy C. Peters
Attorney, Agent, or Firm—Barnes & Thornburg

[57] ABSTRACT

A fastening clip configured for rotation in a housing bore, the clip fashioned to house a beveled terminal region of a linkage of circular cross-section. So that the clip rotates spontaneously into a correct installation position during assembly of the linkage, a plurality of clip orifices are provided and the walls of an associated introductory channel are beveled so that an introductory bevel extends from every point on the edge of the clip to intersect a clip orifice.

1 Claim, 6 Drawing Figures

FASTENING CLIP ROTATABLE IN A HOUSING BORE

The invention relates to a fastening clip rotatable in a housing bore with a central passage orifice to house a bevel terminal region of a linkage of circular cross-section, which clip exhibits in its central region, a circumferential flange with spreadable fastening elements extending in one direction, and wherein a linkage region adjacent to the beveled terminal region of the linkage is held in a clip orifice disposed in cylindrical walls enclosing the passage orifice, the walls extending from the flange in another direction substantially opposite to the first direction. For the insertion of the linkage, an introductory channel is provided, the initial width of which is such that the clip orifice is enclosed by the cylindrical walls for more than 180° about the periphery of the clip orifice. The introductory channel begins on the periphery of the clip orifice at a point remote from the circumferential flange and extends outwardly from the flange.

The known clips exhibit only one clip orifice and a circumferential edge, except for the interruption by a single introductory channel. This means that, during assembly, in the majority of cases, the linkage to be introduced, strikes a circumferential edge region, so that the clip has to be rotated by hand into a correct position into assembly.

A fastening clip of the type described is disclosed in British Pat. No. 967,224. Clips of this type exhibit the disadvantage that, during assembly, in the majority of cases the linkage to be introduced strikes an all-round edge region, so that the clip first has to be rotated by hand into a correct position for assembly.

A similar fastening element, although not of the generic type, is also illustrated in FIG. 4 of German Utility Design No. 8,002,294. However, in the case of this known fastening element, a manual rotation into the correct position for assembly will also be necessary in many cases.

An object of the present invention is to overcome the disadvantages of the prior art and to produce a fastening clip which rotates itself, automatically during assembly, into a suitable position upon introduction of the linkage.

Another object of the invention is to produce a fastening clip of the type described above wherein more than one clip orifice is provided, and wherein the walls of associated introductory channels are beveled so that an introductory bevel extends from every point on an edge of the clip remote from the flange to a clip orifice.

Another object of the invention is to produce a fastening clip to be rotatably fastened in a housing bore and for receiving a linkage of circular cross-section having a linkage region and a beveled terminal region adjacent thereto, the fastening clip comprising a flange circumferential to the clip located substantially in a central region of said clip, a plurality of spreadable fastening elements extending from the flange in a first direction, cylindrical walls extending from the flange in a second direction substantially opposite to said first direction, each cylinder wall having an outer surface, a central passage orifice within the cylindrical walls, the central passage orifice having an introductory channel in each cylindrical wall remote from the flange for directing the beveled terminal region of the linkage into said central passage orifice, each introductory channel having an interior surface, a plurality of clip orifices in said cylindrical walls for holding the linkage region received from the introductory channel of the central passage orifice, each clip orifice having a periphery, each of the cylindrical walls being dimensioned so that each clip orifice is enclosed by the cylindrical walls for more than 180° about the periphery of said clip orifice, and wherein each of the interior surfaces of the introductory channels is beveled inwardly towards the flange from every point on the outer surface of the cylindrical wall contiguous thereto to a clip orifice.

These and other objects, features and advantages of the present invention will become more apparent from the following description when taken in connection with the accompanying drawings which show, for the purposes of illustration only, plural embodiments in accordance with the present invention, and wherein.

Figure 1:
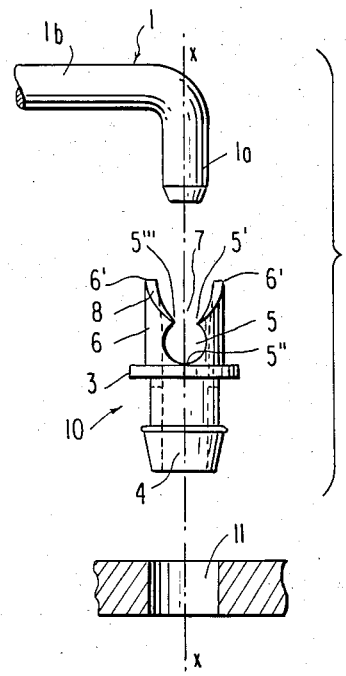
FIG. 1 shows a side elevation of a fastening clip with two clip orifices and a linkage to be assembled.
Figure 2:
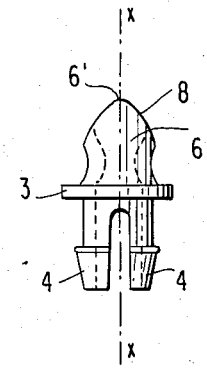
FIG. 2 shows the clip according to FIG. 1 in a view rotated through 90° about an axis x—x.
Figure 5:
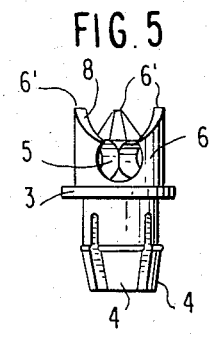
FIG. 5 shows a side elevation of a fastening clip with three clip orifices.
Figure 3:
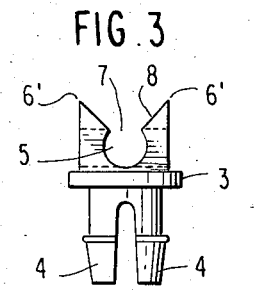
FIG. 3 shows a side elevation of a fastening clip with four clip orifices.
Figure 6:
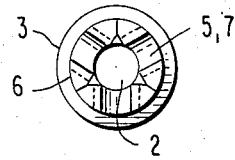
FIG. 6 shows a plan of the clip according to FIG. 5.
Figure 4:
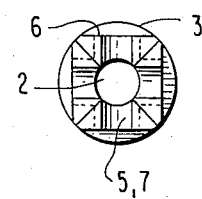
FIG. 4 shows a plan of the clip according to FIG. 3.

Referring now to the drawings wherein like reference numerals are used to designate like parts and more particularly to FIGS. 1 and 2, fastening clip 10 is designed to house a beveled terminal region 1a of a linkage 1, FIG. 1, the clip exhibiting a central passage orifice 2 extending in the longitudinal direction along the axis x—x, a circumferential flange 3 located substantially central to the clip and adjacent to the circumferential flange 3, spreadable fastening elements 4 extending in a first direction from the circumferential flange 3. A variable number of circular clip orifices 5 is provided, other examples of which are shown in FIGS. 3–6 adjacent the circumferential flange 3 and remote from the spreadable fastening elements 4. Although the orifices 5 are open, between points 5' and 5''', remote from circumferential flange 3, adjacent circumferential flange 3, the orifices 5 are enclosed for more than 180°, from 5' to 5'' to 5''', by cylindrical walls 6. Introductory channels 7 are arranged contiguous to the clip orifices 5, and surfaces 8 of the cylindrical walls 6 are beveled so that an introductory bevel at 8 leads from every point on the edge of the cylindrical walls 6 of the fastening clip 10 remote from circumferential flange 3 to a clip orifice 5. This means that in the center between each two clip orifices 5, the cylindrical walls 6 reach a point 6' most remote from the circumferential flange 3 and the walls slope away from the point 6' around the periphery of walls 6 toward the clip orifices 5, the surfaces 8 being beveled inwardly and toward circumferential flange 3 to intersect the clip orifices 5.

In this manner during assembly, the region 1b of the linkage 1 can be applied to the fastening clip 10 at any desired point of the circumference of the clip 10. When this is done, region 1a will then always strike a corresponding introductory bevel at 8 and the clip 10 when inserted into a housing bore 11 will cause region 1b to rotate into the correct position automatically.

While we have shown and described plural embodiments in accordance with the present invention, it is understood that the same is not limited thereto but is susceptible to numerous changes and modifications as known to one having ordinary skill in the art and we therefore do not wish to be limited to the details shown and described herein, but intend to cover all such modifications as are encompassed by the scope of the appended claim.

We claim:

1. To be rotatably fastened in a housing bore and for receiving a linkage of circular cross-section having a linkage region and a beveled terminal region adjacent thereto, a fastening clip comprising, a flange circumferential to the clip located substantially in a central region of said clip, a plurality of spreadable fastening elements extending from the flange in a first direction, cylindrical walls extending from the flange in a second direction substantially opposite to said first direction, each cylindrical wall having an outer surface, a central passage orifice within the cylindrical walls, the central passage orifice having an introductory channel in each cylindrical wall remote from the flange for directing the bevelled terminal region of the linkage into said central passage orifice, each introductory channel having an interior surface, a plurality of clip orifices in said cylindrical walls for holding the linkage region received from the introductory channel of the central passage orifice, each clip orifice having a periphery, each of the cylindrical walls being dimensioned so that each clip orifice is enclosed by the cylindrical walls for more than 180° about the periphery of said clip orifice, and wherein each of the interior surfaces of the introductory channels is beveled inwardly towards the flange from every point on the outer surface of the cylindrical wall contiguous thereto to a clip orifice.

* * * * *